(12) United States Patent
Takehana et al.

(10) Patent No.: US 7,311,119 B2
(45) Date of Patent: Dec. 25, 2007

(54) VALVE APPARATUS

(75) Inventors: Norio Takehana, Iwate (JP); Noriaki Chiba, Iwate (JP); Hideki Imamatsu, Iwate (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 11/291,986

(22) Filed: Dec. 2, 2005

(65) Prior Publication Data

US 2006/0118190 A1    Jun. 8, 2006

(30) Foreign Application Priority Data

Dec. 3, 2004    (JP) ............................. 2004-351179

(51) Int. Cl.
*F16K 15/14* (2006.01)
(52) U.S. Cl. ................. 137/854; 137/512.15; 137/856; 137/315.33
(58) Field of Classification Search ........... 137/512.15, 137/852, 854, 856, 315.33; 417/566, 569, 417/571
See application file for complete search history.

(56) References Cited

U.S. PATENT DOCUMENTS

| 4,218,407 | A | * | 8/1980 | Robertson ................. 261/64.1 |
| 5,014,739 | A | * | 5/1991 | Csaszar ................. 137/512.15 |
| 5,601,112 | A | * | 2/1997 | Sekiya et al. ........... 137/512.15 |
| 6,579,074 | B2 | | 6/2003 | Chiba |

* cited by examiner

*Primary Examiner*—Ramesh Krishnamurthy
(74) *Attorney, Agent, or Firm*—Wenderoth, Lind & Ponack, L.L.P.

(57) ABSTRACT

A valve apparatus is small, and regulates a fuel amount by restricting a lift amount of a valve. A columnar portion is formed on a pump body. The columnar portion is inserted into a check valve and a washer formed with a protruding portion which protrudes outward from a flange portion, and the check valve and washer are attached or fixed to the pump body by subjecting a tip end of the columnar portion to thermal caulking or the like. An outer diameter of the protruding portion is set to be relatively smaller than an outer diameter of the flange portion such that when the check valve is sandwiched between the protruding portion and pump body, the check valve contacts an outer peripheral edge of the flange portion when the check valve opens. As a result, a lift amount of the valve can be restricted, and a flow rate of fuel passing through a passage can be maintained at a constant level.

4 Claims, 5 Drawing Sheets

VALVE APPARATUS

BACKGROUND OF THE INVENTION

1. Field of the Invention

The present invention relates to a valve apparatus capable of regulating opening of a valve for opening and closing a passage.

2. Description of Related Art

Conventionally, a diaphragm type fuel pump, in which an intake/discharge pumping action is performed by activating a diaphragm using pulsation pressure of an engine, is used as a fuel supply apparatus for supplying fuel from a fuel tank to a fuel injection apparatus or the like. Japanese Unexamined Patent Application 2002-202026 is known as an example of a conventional diaphragm type fuel pump, structure of which is shown in FIGS. 3 and 4. A fuel pump 10 is constituted by a pump body 16 formed with an intake port 12 and a discharge port 14, shown in FIG. 3, a bottom body 18 disposed on one of side faces of the pump body 16, a cover 20 disposed on another side face of the pump body 16, a diaphragm 22 sandwiched between the pump body 16 and bottom body 18, and a membrane 24 sandwiched between the pump body 16 and cover 20. The pump body 16, bottom body 18, and cover 20 are formed using a synthetic resin material which is capable of plastic deformation under application of heat, but may be formed from metal.

A pump chamber 26 is formed between the diaphragm 22 and pump body 16, and a pulse chamber 28 is formed between the diaphragm 22 and bottom body 18. A pulse introduction passage 30 for introducing a pulse pressure generated by an engine, not shown in the drawings, into the pulse chamber 28 is formed in the bottom body 18, and the pulse pressure is introduced into the pulse chamber 28 through the pulse introduction passage 30.

A fuel intake chamber 32 and a fuel discharge chamber 34 are formed between the membrane 24 and pump body 16. A damper chamber 36 which opposes the fuel intake chamber 32 via the membrane 24, and a damper chamber 38 which opposes the fuel discharge chamber 34 via the membrane 24, are formed between the membrane 24 and cover 20. The fuel intake chamber 32 communicates with the intake port 12 shown in FIG. 3, and the fuel discharge chamber 34 communicates with the discharge port 14 shown in FIG. 3.

An intake communication passage 40 connecting the fuel intake chamber 32 and pump chamber 26, and a discharge communication passage 42 connecting the pump chamber 26 and fuel discharge chamber 34, are formed in the pump body 16. A check valve 44 formed from a flexible material for opening and closing the intake communication passage 40 is attached to the pump body 16. The check valve 44 serves to move fuel only from the fuel intake chamber 32 into the pump chamber 26. A check valve 46 formed from a flexible material for opening and closing the discharge communication passage 42 is also attached to the pump body 16. This check valve 46 serves to move fuel only from the pump chamber 26 into the fuel discharge chamber 34. The check valves 44, 46 are fixed to the pump body 16 by rubber grommets 48.

As shown in FIG. 5(a), a hole 50 for inserting a part of the grommet 48 is formed in the pump body 16 in the vicinity of the intake communication passage 40 and the discharge communication passage 42. The grommet 48 is formed by integrating a head portion 52 on one end side, a stopper portion 54 on another end side, and a neck portion 56 joining the head portion 52 and stopper portion 54. An outer diameter of the head portion 52 of the grommet 48 is set to a larger dimension than an inner diameter of the hole 50 in the pump body 16, but such that the head portion 52 of the rubber grommet 48 can pass through the hole 50 in the pump body 16 when pushed into the hole 50 forcibly. An outer diameter of the stopper portion 54 of the grommet 48 is set with a larger diameter than the head portion, and has a shape and dimensions which prevent it from passing through the hole 50 in the pump body 16 even when pushed into the hole 50 forcibly. The check valve 44 formed from a flexible material takes a disk form having a central hole 58. An inner diameter of the hole 58 in the check valve 44, 46 is set to a smaller dimension than the outer diameter of the head portion 52 of the grommet 48.

A procedure for attaching the check valve 44, 46 to the pump body 16 is shown in FIGS. 5(a) and 5(b). First, the head portion 52 of the grommet 48 is inserted into the hole 58 in the check valve 44, 46, thereby attaching the check valve 44, 46 to the grommet 48. Then, the head portion 52 of the grommet 48 is inserted into the hole 50 in the pump body 16. Thus, the pump body 16 and check valve 44, 46 are sandwiched between the head portion 52 and stopper portion 54 of the grommet 48. As a result, the check valve 44, 46 is attached to the pump body 16. When the check valve 44, 46 is attached to the pump body 16, the intake communication passage 40 or discharge communication passage 42 is closed by the check valve 44, 46.

In the diaphragm type fuel pump shown in FIG. 4, by introducing a pulse pressure generated in a crank chamber (not shown) of an engine into the pulse chamber 28, the diaphragm 22 performs an alternating stroke movement between pump chamber 26 side and pulse chamber 28 side. By virtue of this stroke action of the diaphragm 22, fuel that is introduced into the fuel intake chamber 32 from a fuel tank, not shown in the drawings, enters the pump chamber 26, passes from the pump chamber 26 into the fuel discharge chamber 34, and is discharged to a fuel injection apparatus or the like.

A diaphragm type fuel pump comprising a check valve attached using a conventional attachment structure has the following problems.

(1) Operations are required to insert the head portion 52 of the grommet 48 into the hole 58 in the check valve 44, 46, and to insert the head portion 52 of the grommet 48 into the hole 50 in the pump body 16, and therefore a large number of steps is involved in an operation for attaching the check valve 44, 46 to the pump body 16.

(2) The grommet 48 is made of rubber, and therefore deteriorates when it comes into contact with fuel.

(3) To fix a central position of disk-form check valve 44, 46 to the pump body 16 using the rubber grommet 48, an inner diameter of neck portion 56 of the grommet 48 must be increased to a certain extent. Accordingly, an outer diameter of the disk-form check valve 44, 46 must be increased, and as a result, a size of the pump itself increases.

(4) A fuel intake amount and fuel discharge amount passing through the intake communication passage 40 and discharge communication passage 42 are determined by a passage diameter of the intake communication passage 40 and discharge communication passage 42, and pulse pressure that is generated by the engine and introduced into the pulse chamber 28. However, with a constitution in which the check valve 44, 46 is fixed to the pump body 16 by the grommet 48, the check valve 44, 46 curls up greatly from the intake communication passage 40 or discharge communication passage 42 when the pulse pressure is great (see dot-dash line in FIG. 5), with a result that a valve lift amount of the check valve 44, 46 cannot be restricted.

Due to these problems (1) through (4), it is difficult in the conventional diaphragm type pump shown in FIG. 4 to reduce a size of the pump itself, and desired performance cannot be obtained.

SUMMARY OF THE INVENTION

The present invention has been designed in consideration of the points described above, and it is an object thereof to provide a valve apparatus which is small and reasonably priced, and with which a flow rate can be regulated by restricting a lift amount of a valve.

To achieve this object, a valve apparatus of the present invention is a valve apparatus in which a valve for opening and closing a passage through which a liquid flows is attached to a body, wherein a valve opening restricting member, for restricting opening (movement) of the valve by contacting a part of the valve when the passage is open, is attached to the body together with the valve by fixing structure. In the present invention, the valve is formed from a flexible material in a flat plate shape. In the present invention, a columnar portion is formed on the body, a hole is formed in the valve for inserting the columnar portion into the valve, a hole is formed in the valve opening restricting member for inserting the columnar portion into the valve opening restricting member, the columnar portion is inserted into the hole in the valve and the hole in the valve opening restricting member, and the valve and valve opening restricting member are attached to the body by the fixing structure. In the present invention, the body is formed using synthetic resin as a material, and the fixing structure is constituted by thermal caulking for crushing a tip end portion of the columnar portion using heat.

According to the present invention, the valve opening restricting member comprising an opening restricting portion which does not contact the valve when the passage is closed but does contact the valve when the passage is open, is attached to the body. Thus, a valve lift amount (valve opening) can be restricted when the passage is opened by the valve, and a flow rate of liquid that flows through the passage can be maintained at a constant level. For example, in a diaphragm type pump which is activated by introduction of pulse pressure from an engine, the valve lift amount can be restricted even when the pulse pressure from the engine is excessively high, and hence an amount of fuel passing through the passage can be maintained at a constant level. Note that by preparing a plurality of washers serving as the valve opening restricting member and selecting a washer which corresponds to a desired flow rate, the desired flow rate can be obtained.

Furthermore, in the present invention, the columnar portion need only be subjected to a caulking operation in order to attach the valve and valve opening restricting member to the body, and hence time required to attach the valve to the body can be reduced. By forming the body using a synthetic resin which deforms under heat as a material, a thermal caulking operation can be performed, thereby enabling a large reduction in the time required to attach the valve to the body. The washer and valve are attached to the body by inserting the columnar portion formed on the body into the hole in the valve and the hole in the valve opening restricting member, and then crushing the columnar portion through caulking. Accordingly, an outer diameter of the columnar portion can be made smaller than an outer diameter of a neck portion of a conventional grommet, and hence an inner diameter of the hole in the valve can also be reduced. As a result, the valve itself can be reduced in size, thereby enabling a reduction in a size of the diaphragm type pump or the like comprising the valve. Moreover, since a rubber grommet does not have to be used to assemble the valve, there is no danger of deterioration caused by direct exposure to fuel.

DETAILED DESCRIPTION OF THE PREFERRED EMBODIMENTS

Figure 1A:
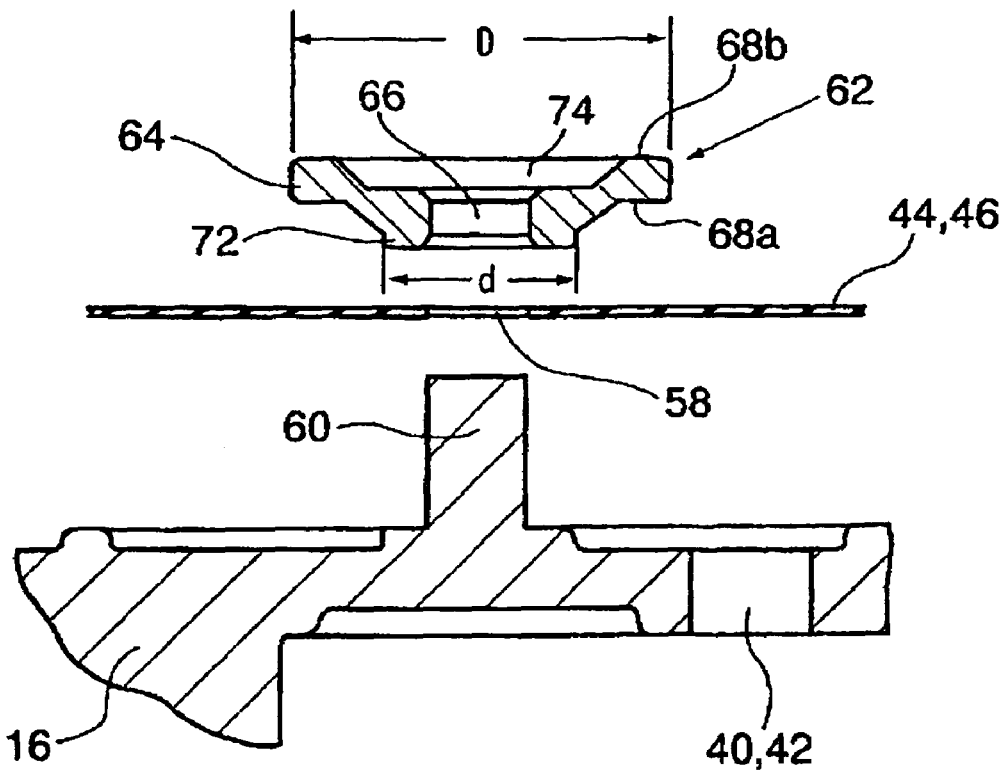
FIGS. 1(a) and 1(b) are sectional views showing a valve apparatus according to the present invention, with FIG. 1(b) showing the valve apparatus in an assembled state.
Figure 1B:
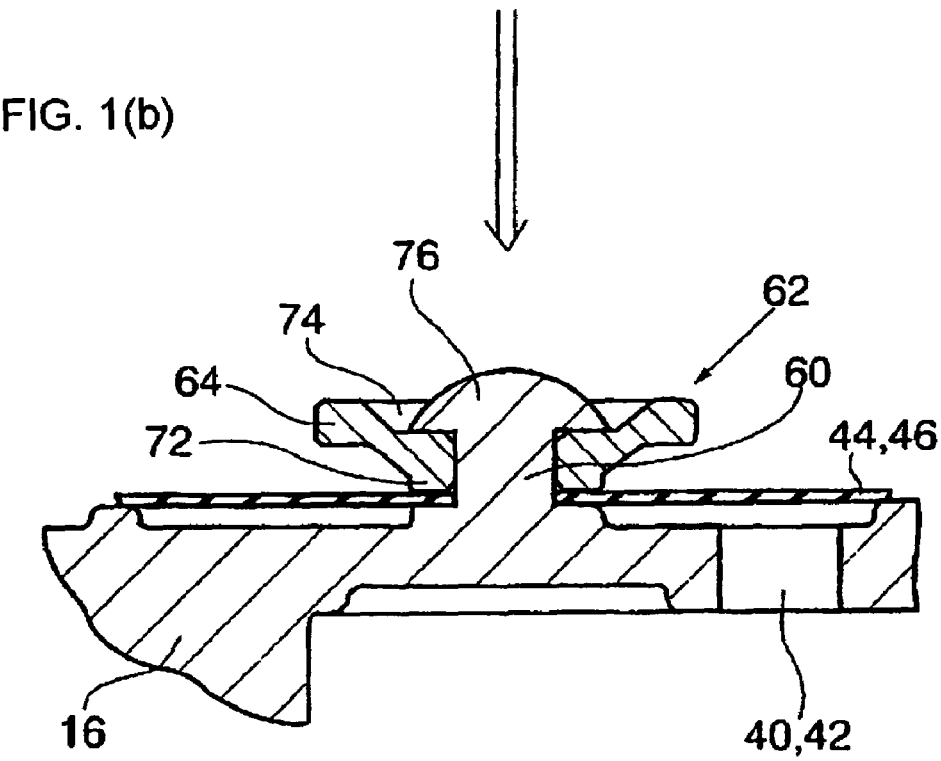
Figure 4:
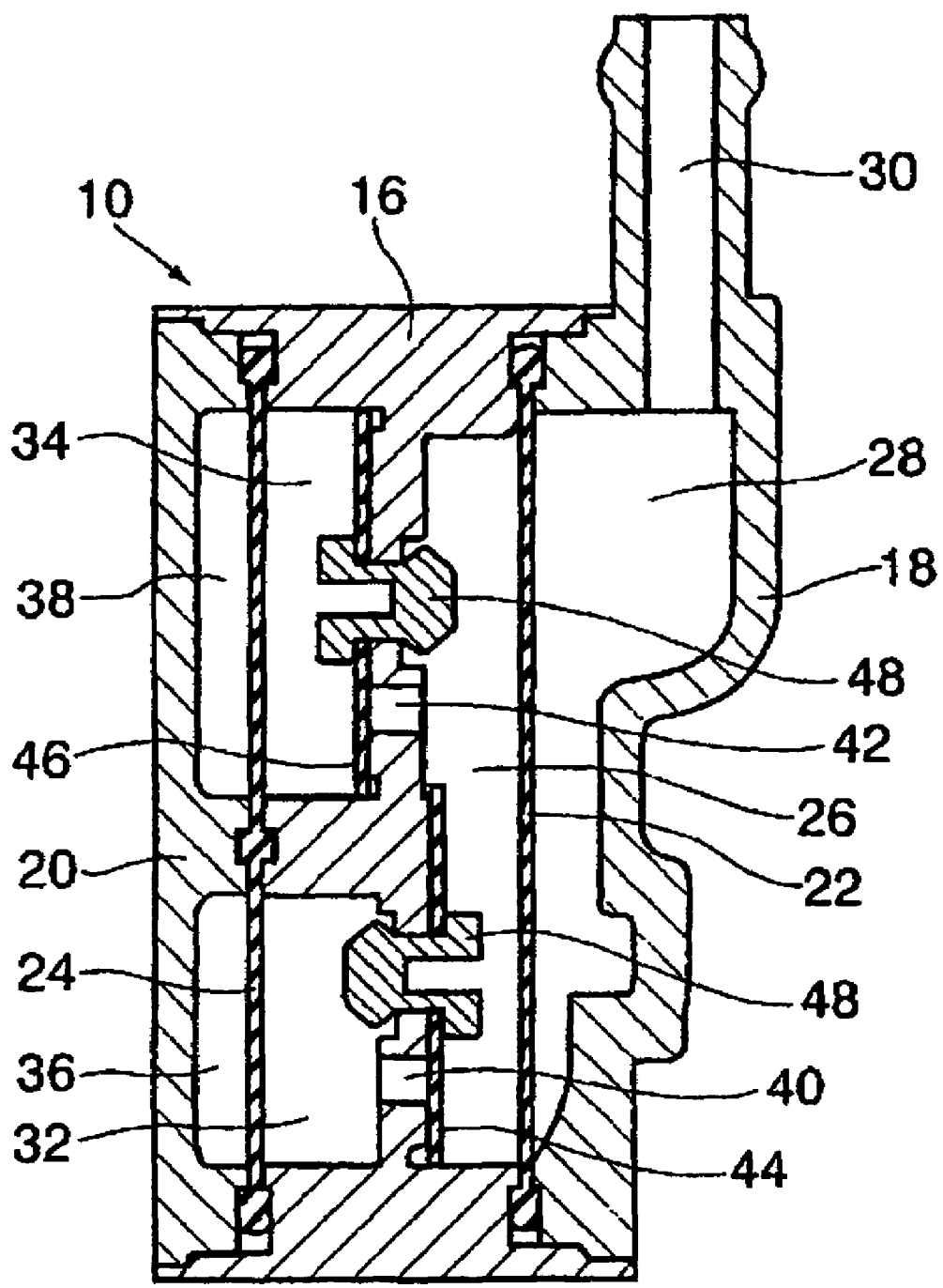
FIG. 4 is a sectional view along A-A in FIG. 3.
Figure 5A:
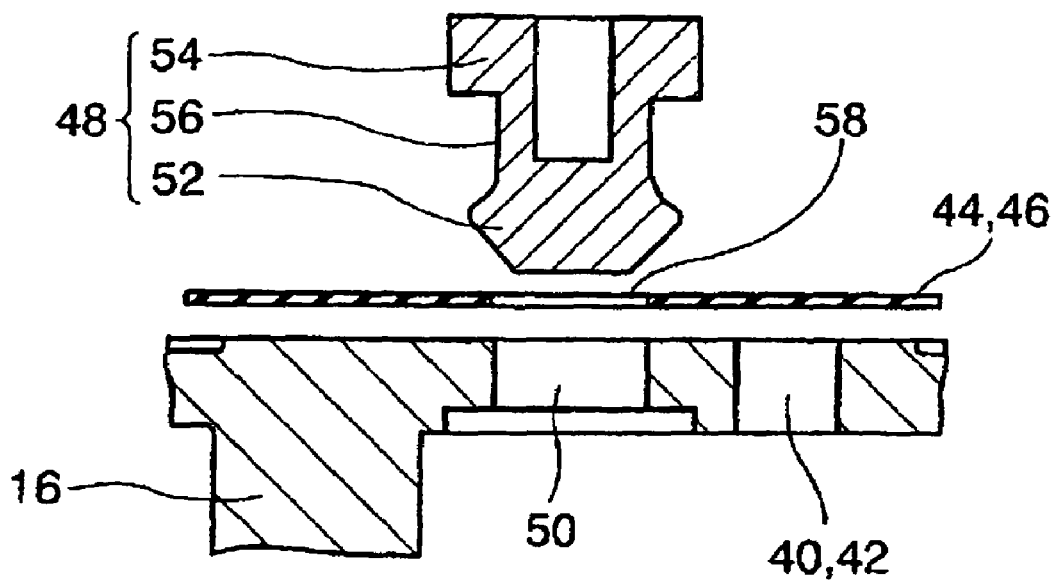
FIGS. 5(a) and 5(b) are sectional views showing a conventional check valve attachment structure used in FIG. 4.
Figure 5B:
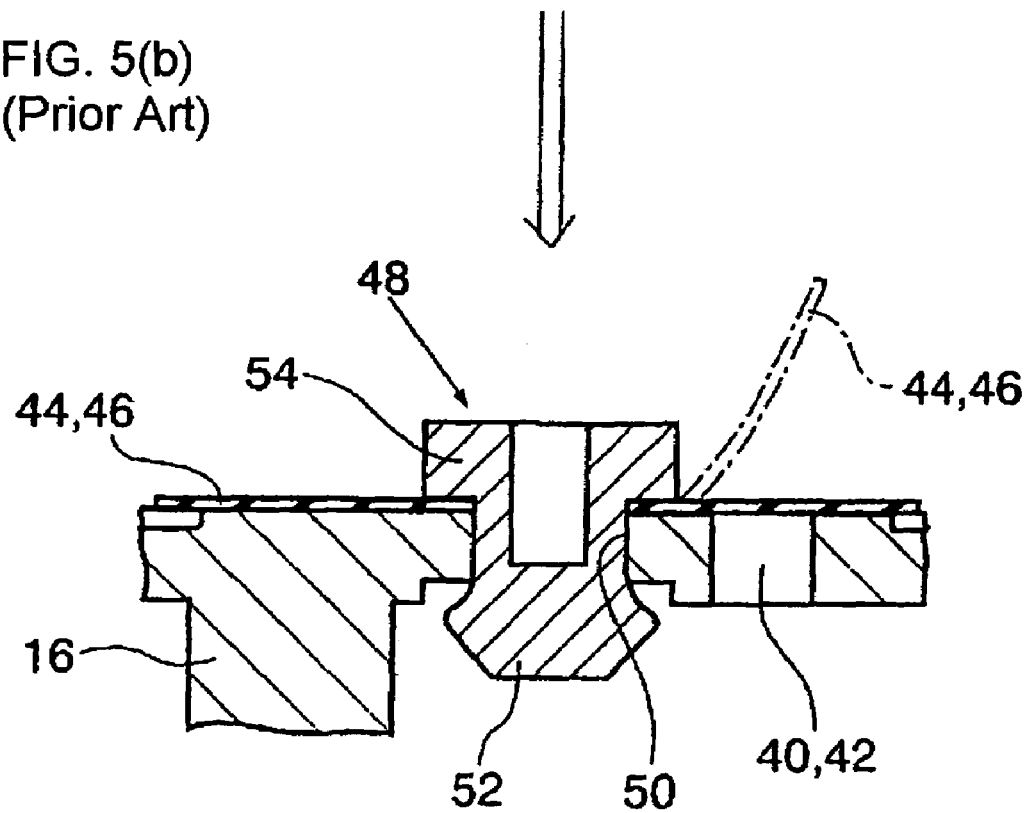

Next, the present invention will be described on the basis of the drawings. FIGS. 1(a) and 1(b) are sectional views showing a valve apparatus according to the present invention. In FIGS. 1(a) and 1(b), identical reference numerals to those used in FIGS. 4, 5(a) and 5(b) denote identical members. In place of the conventional hole 50 formed in the pump body 16 and the grommet 48 which is inserted into the hole 50, the present invention employs a columnar portion 60 formed on the pump body 16, and a washer 62 serving as a valve opening restricting member that is attached to the columnar portion 60. As shown in FIG. 1(a), the columnar portion 60 is formed integrally with the pump body (body) 16 in the vicinity of intake communication passage (passage) 40 and discharge communication passage (passage) 42. The columnar portion 60 is parallel to a passage direction of the intake communication passage 40 and discharge communication passage 42, and formed so as to protrude toward an exterior perpendicularly to a surface of the pump body 16. Check valve (valve) 44, 46 for opening and closing the intake communication passage 40 and discharge communication passage 42 is formed in a disk shape from a flexible material, similarly to a conventional apparatus, and hole 58 is provided in a center thereof. The hole 58 is set to a size which fits perfectly over the columnar portion 60.

In the present invention, the washer 62, which serves as a valve opening restricting member, is used as a member that is attached to the columnar portion 60. The washer 62 comprises a disk-form flange portion (main body portion) 64, and a hole 66 for inserting the columnar portion 60 into the washer 62 is formed in a central position of the flange portion 64. An outer peripheral edge 70 of the flange portion 64, located on a surface 68a on one side of the flange portion 64 of the washer 62, serves as an opening restricting portion which does not contact the check valve 44, 46 when the passage 40, 42 is closed but does contact the check valve 44, 46 when the passage 40, 42 is open. The opening restricting portion does not necessarily have to be the outer peripheral edge 70 of the flange portion 64. The opening restricting portion (outer peripheral edge 70) has a beveled form. When the washer 62 is manufactured using press working, for example, a beveled shape having no angled portions is formed on the outer peripheral edge 70 of the flange portion 64.

A protruding portion 72 which protrudes outward from the flange portion 64 is formed integrally with the flange portion 64 on a periphery of the hole 66 and on the same surface 68a that is formed with the opening restricting member (outer peripheral edge 70). An outer diameter d of the protruding portion 72 is set to be greater than an inner diameter of the hole 66 and smaller than an outer diameter D of the outer peripheral edge 70 of the flange portion 64. An indented portion 74 having a diameter which is greater than the inner diameter of the hole 66 and smaller than the outer diameter D of the flange portion 64 is formed on a surface 68b on another side of the washer 62. A height of the columnar portion 60 on the pump body 16 is preferably set such that when the check valve 44, 46 and washer 62 are fitted over the columnar portion 60, a tip end of the columnar portion 60 protrudes from the indented portion 74.

Next, a method of attaching the check valve 44, 46 and washer 62 to the pump body 16 will be described. As shown in FIGS. 1(a) and 1(b), the check valve 44, 46 is fitted over the columnar portion 60 of the pump body 16 by inserting the columnar portion 60 into the hole 58. The washer 62 is then fitted over the columnar portion 60 by inserting the columnar portion 60 into the hole 66. Here, the washer 62 is fitted over the columnar portion 60 with the protruding portion 72 side at the tip end. Thus, the check valve 44, 46 is sandwiched between the protruding portion 72 of the washer 62 and the pump body 16. When the check valve 44, 46 is sandwiched between the protruding portion 72 of the washer 62 and the pump body 16, the columnar portion 60 protrudes upward from the indented portion 74 of the washer 62. Next, a caulking operation is performed using heat or a load to crush a tip end location of the columnar portion 60 in a direction which increases an outer diameter thereof, and thus the washer 62 and check valve 44, 46 are attached or fixed to the pump body 16 by a caulked portion 76 that is crushed to an increased outer diameter as shown in FIG. 1(b). The caulked portion 76, which extends in a horizontal direction, is accommodated within the indented portion 74 formed in the washer 62. Note that although the washer 62 and check valve 44, 46 are preferably fixed to the pump body 16, any constitution is acceptable as long as the washer 62 and check valve 44, 46 do not become detached from the columnar portion 60.

If the pump body 16 is formed using a synthetic resin which is deformed by heat, the washer 62 and check valve 44, 46 can be fixed to the pump body 16 easily using thermal caulking, in which heat is applied to the columnar portion 60. The pump body 16 may be formed using metal instead of synthetic resin, and conventional caulking or fixing using a screwing process may be employed as fixing structure (the washer 62 itself may also be used as fixing structure). However, when the pump body 16 is formed using synthetic resin and thermal caulking is performed, the operation to fix the washer 62 and check valve 44, 46 to the pump body 16 can be performed more efficiently.

An operation of the check valve 44, 46 in the present invention will now be described on the basis of FIG. 2. In a case where the present invention is applied to a diaphragm type fuel pump, the check valve 44, 46 is separated from the pump body 16 by pulsation of an engine, thereby opening the intake communication passage 40 or discharge communication passage 42 (a state shown in FIG. 2). Here, a position on the check valve 44, 46 which contacts a tip end outer peripheral edge 78 of the protruding portion 72 serves as a base from which the check valve 44, 46 is separated from the pump body 16. The check valve 44, 46 is separated from the pump body 16 gradually from the position which contacts the tip end outer peripheral edge 78 of the protruding portion 72 toward a free end 80.

In the present invention, during an operation to open the check valve 44, 46, a position on the check valve 44, 46 midway between the position which contacts the tip end outer peripheral edge 78 of the protruding portion 72 and the free end 80 contacts the outer peripheral edge (opening restricting portion) 70 of the flange portion 64 of the washer 62. When the check valve 44, 46 contacts the outer peripheral edge 70 of the flange portion 64, lift of the check valve 44, 46 is restricted, and hence fuel can be supplied in an appropriate amount even when an excessive pulsation negative pressure is generated in the engine. Note that the outer peripheral edge 70 of the flange portion 64, which is contacted by the check valve 44, 46, is beveled, and therefore damage to the check valve 44, 46 can be prevented even when the check valve 44, 46 contacts the outer peripheral edge 70 of the flange portion 64 intermittently.

In the present invention described above, even when excessive negative pressure or the like acts in the opening direction of the check valve 44, 46, opening of the intake communication passage 40 or discharge communication passage 42 by the check valve 44, 46 can be restricted to a fixed amount, and hence a predetermined amount of fuel or the like can be taken in or discharged. Note that regulation of the opening of the check valve 44, 46 can be varied according to a height H (FIG. 2) from a tip end outer peripheral edge 78 of the protruding portion 72 on the washer 62 to the outer peripheral edge 70 of the flange portion 64, and a distance B (FIG. 2) in a horizontal direction from the tip end outer peripheral edge 78 of the protruding portion 72 on the washer 62 to the outer peripheral edge 70 of the flange portion 64. Accordingly, by preparing various washers 62 each having a different height H and distance B, and using a washer 62 which corresponds to a fuel intake amount and fuel discharge amount, a fuel amount can be varied.

In the present invention, the check valve 44, 46 is fitted over the columnar portion 60 formed integrally with the pump body 16, whereupon the check valve 44, 46 is attached or fixed to the pump body 16. Accordingly, the outer diameter of the columnar portion 60 can be made smaller than an outer diameter of a conventional rubber grommet (an outer diameter of the neck portion 56 of the grommet 48, see FIG. 5). Hence in the present invention, the inner diameter of the hole 58 in the check valve 44, 46 can be reduced, the outer diameter of the check valve 44, 46 can be reduced in comparison with a conventional check valve, and as a result, a reduction in an overall size of the pump can be achieved. Further, the check valve 44, 46 and washer 62 are attached or fixed to the columnar portion 60 provided on the pump body 16 by caulking (thermal caulking). Hence, in comparison with an operation for fixing the check valve 44, 46 using a conventional rubber grommet, a number of assembly steps can be reduced, an operational load can be lightened, and cost scan be reduced. In the present invention, rubber components (such as a grommet) which deteriorate when impregnated with fuel are not used, and therefore pump performance can be maintained and stabilized.

Figure 2:
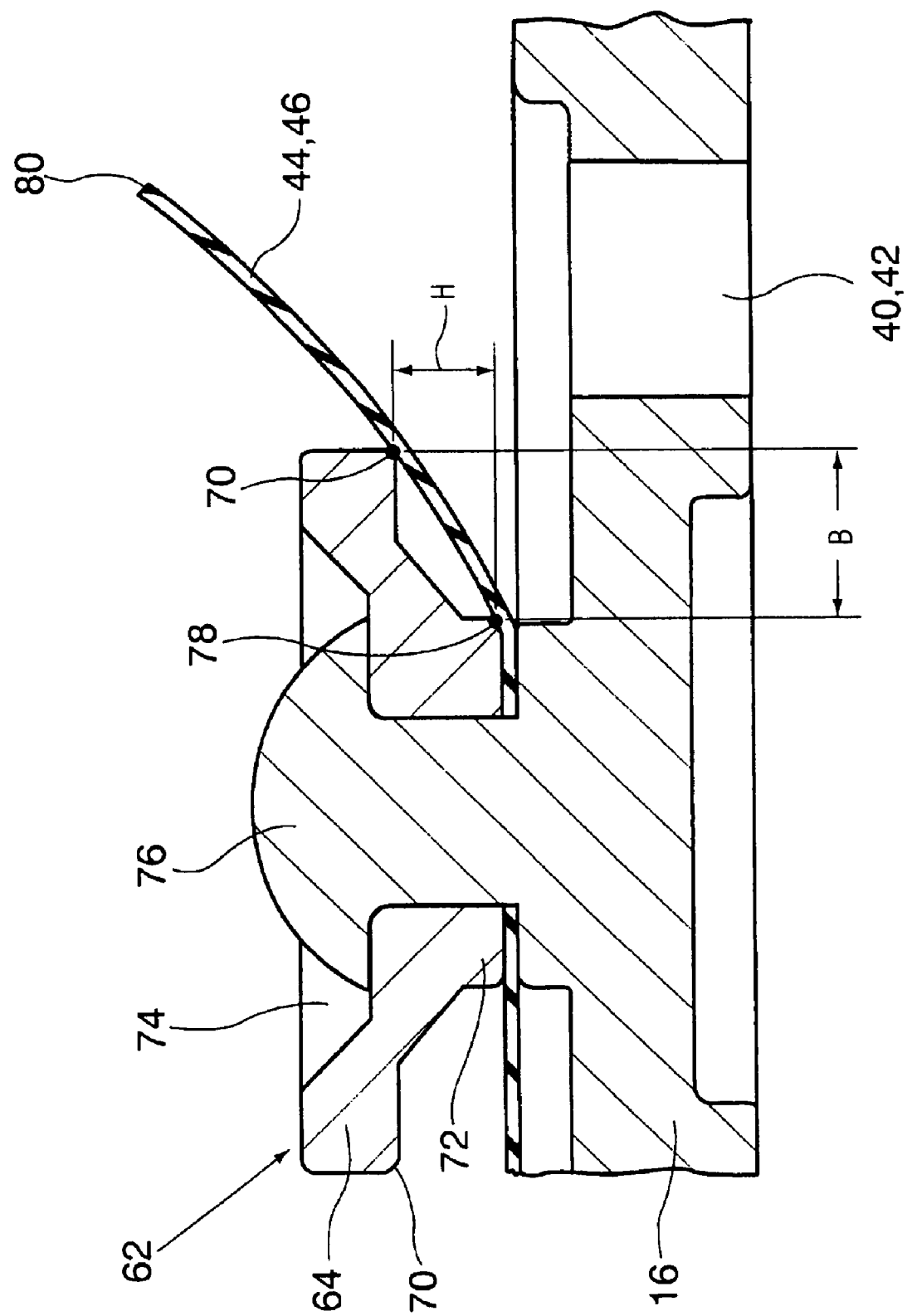
FIG. 2 is an enlarged sectional view showing main parts of FIG. 1.
Figure 3:
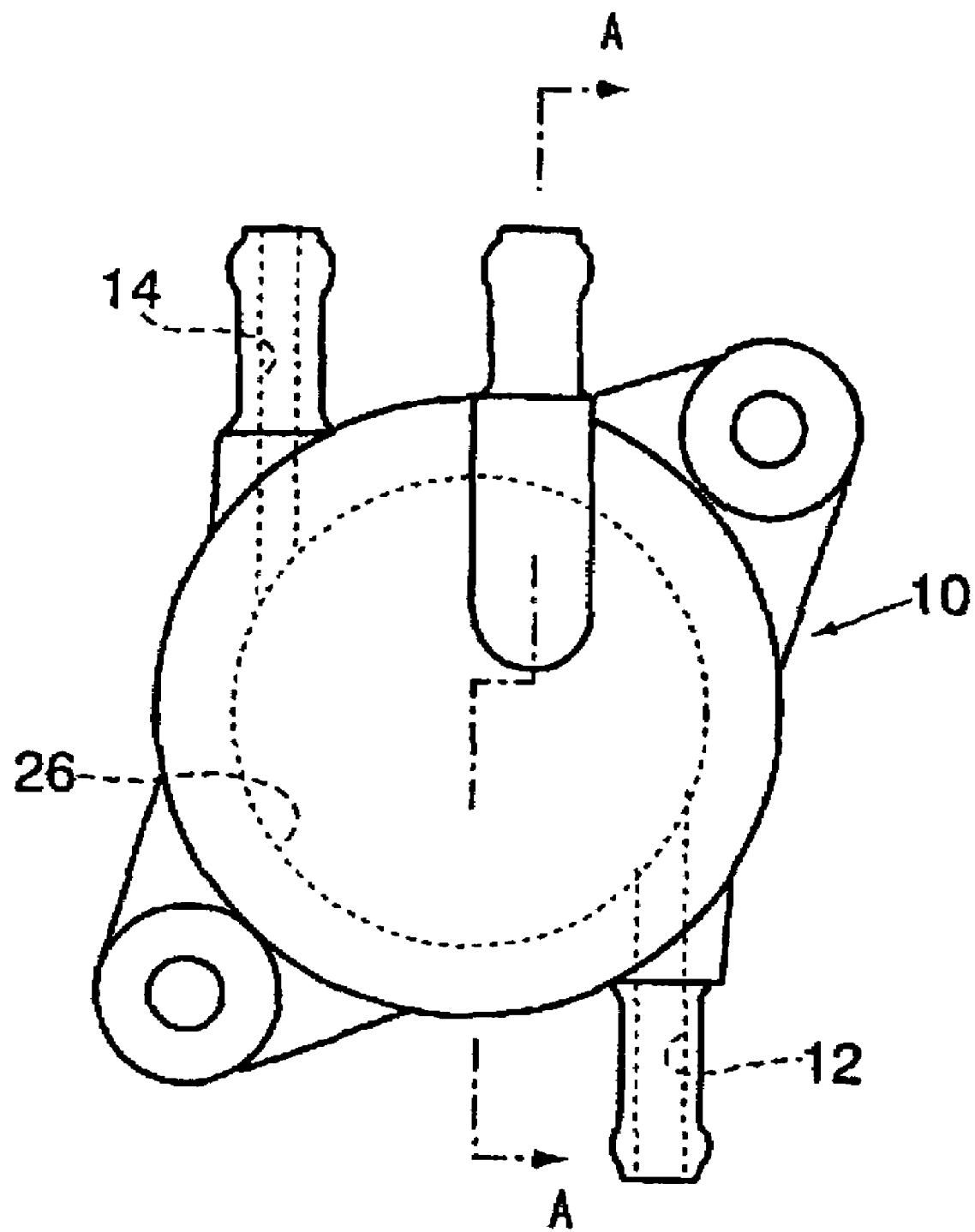
FIG. 3 is a plan view of a conventional diaphragm type fuel pump.

An example was described in which the valve apparatus according to the present invention, shown in FIGS. 1(a), 1(b) and 2, is provided in a diaphragm type pump. However, the valve apparatus according to the present invention is not limited to a pump, and may be applied to any apparatus in which a passage is opened and closed by a valve.

What is claimed is:

1. A valve apparatus comprising:
  a body having a synthetic resin columnar portion;
  a valve for opening and closing a passage through which a liquid is to flow, said valve having a hole receiving said columnar portion; and
  a valve opening restricting member for restricting movement of said valve by contacting a part of said valve when the passage is open, said valve opening restricting member having a hole receiving said columnar portion,
  wherein said valve and said valve opening restricting member are fixedly attached to said body by thermally caulking a tip end portion of said synthetic resin columnar portion such that said tip end portion becomes crushed and fixes said valve and said valve opening restricting member to said body.

2. The valve apparatus according to claim 1, wherein said body comprises a synthetic resin body, with the synthetic resin of said body being the same as the synthetic resin of said columnar portion.

3. The valve apparatus according to claim 2, wherein said valve comprises a flexible material in a flat plate shape.

4. The valve apparatus according to claim 1, wherein said valve comprises a flexible material in a flat plate shape.

* * * * *